United States Patent
Nakanishi et al.

(10) Patent No.: US 7,043,902 B2
(45) Date of Patent: May 16, 2006

(54) EXHAUST GAS PURIFICATION SYSTEM

(75) Inventors: Yoshiyuki Nakanishi, Saitama (JP); Kenji Dosaka, Saitama (JP); Keizo Iwama, Saitama (JP); Shinya Ishimaru, Saitama (JP); Masanobu Miki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 10/768,650

(22) Filed: Feb. 2, 2004

(65) Prior Publication Data
US 2004/0175305 A1 Sep. 9, 2004

(30) Foreign Application Priority Data
Mar. 7, 2003 (JP) .............................. 2003-060823

(51) Int. Cl.
*F01N 3/00* (2006.01)
(52) U.S. Cl. ............................. 60/286; 60/274; 60/275; 60/301; 60/303; 422/186.03; 422/186.07
(58) Field of Classification Search ................. 60/274, 60/275, 286, 297, 301, 303; 422/186.03, 422/186.04, 186.07, 186.24
See application file for complete search history.

(56) References Cited

U.S. PATENT DOCUMENTS

| | | | | |
|---|---|---|---|---|
| 5,746,051 A | * | 5/1998 | Kieser et al. ................. | 60/275 |
| 6,038,854 A | * | 3/2000 | Penetrante et al. ........... | 60/297 |
| 6,176,078 B1 | * | 1/2001 | Balko et al. .................. | 60/274 |
| 6,247,303 B1 | * | 6/2001 | Broer et al. .................. | 60/274 |
| 6,334,986 B1 | * | 1/2002 | Gieshoff et al. .......... | 423/239.1 |
| 2004/0107695 A1 | * | 6/2004 | Cho et al. ..................... | 60/275 |

FOREIGN PATENT DOCUMENTS

| | | |
|---|---|---|
| JP | 03-232533 | 10/1991 |
| JP | 05-092125 | 4/1993 |
| JP | 06-031173 | 2/1994 |
| JP | 06-099031 | 4/1994 |
| JP | 2001-182525 | 7/2001 |

* cited by examiner

*Primary Examiner*—Binh Q. Tran
(74) *Attorney, Agent, or Firm*—Arent Fox PLLC

(57) ABSTRACT

An exhaust gas purification system equipped, from an upstream side toward downstream side through which an exhaust gas flows, with a plasma reactor and a catalyst unit charged with a catalyst acting on $NO_x$ in the exhaust gas in this order, and equipped with a reducing agent supplying device to supply a reducing agent at an upstream side of the plasma reactor, wherein the catalyst has an $NO_2$ adsorptive catalyst layer and an $NO_2$ selective reduction catalyst layer contacting the $NO_2$ adsorptive catalyst layer.

12 Claims, 9 Drawing Sheets

EXHAUST GAS PURIFICATION SYSTEM

FIELD OF THE INVENTION

The present invention relates to an exhaust gas purification system in an excess oxygen atmosphere, and in particular, relates to the exhaust gas purification system for purifying an exhaust gas of a diesel engine.

BACKGROUND OF THE INVENTION

Conventionally, as a purification system for purifying nitrogen oxides (herein after referred to as $NO_x$) even under a condition where an oxygen concentration is high like an exhaust gas of a diesel engine, an exhaust gas purification system using a $NO_x$ adsorptive catalyst and another one using an urea-selective catalytic reduction (Urea-SCR) are known. However, the exhaust gas purification system using the $NO_x$ adsorptive catalyst has a problem that a huge fuel consumption loss occurs because it need to change an air-fuel ratio of an engine from lean to rich and further to stoichiometric. On the other hand, in the exhaust gas purification system using the urea-selective catalytic reduction a problem remains in a point that a development of infrastructure of an urea becomes indispensable.

Consequently, to solve these problems, systems using $NO_x$ selective reduction catalysts, to be more precise, a platinum catalyst (for example, from a 14th row in a fifth column to a 25th row in a sixth column of page 3 of Japanese patent 2909553), an iridium catalyst (for example, from a fourth row in a fifth column to a 20th row in a sixth column of page 4 of Japanese patent laid open publication Hei 6-31173), and a silver catalyst (for example, from a 35th row in a sixth column of page 4 to a 22th row in an eighth column of page 5 of Japanese patent laid open publication Hei 5-92125) instead of the $NO_x$ adsorptive catalyst and urea-selective catalytic reduction are proposed. However, in an exhaust gas purification system using the platinum catalyst if a reducing agent, for example, a hydrocarbon (hereinafter referred to as HC) is not added in a exhaust gas, a $NO_x$ purification ratio becomes low, and if an added amount of the reducing agent is increased, a temperature of the $NO_x$ selective reduction catalyst becomes out of a range of a purification temperature region due to oxidizing heat, so a system with a high purification ratio cannot be built.

In addition, in an exhaust gas purification system using the iridium catalyst a $NO_x$ purification temperature of the catalyst is high and moreover the catalyst cannot be said to be sufficient in a selectivity for a paraffin. Accordingly, in the exhaust gas purification system an exhaust gas temperature is low, so if it is applied to a diesel engine of which paraffin concentration is high in an exhaust gas, it cannot sufficiently purify the $NO_x$ in the exhaust gas.

In addition, in an exhaust gas purification system using the silver catalyst a $NO_x$ purification temperature of the catalyst is high, so if it is applied to a diesel engine of which exhaust gas temperature is low, it cannot sufficiently purify the $NO_x$ in the exhaust gas.

Consequently, a system which substitutes the exhaust gas purification systems and can sufficiently purify the $NO_x$ in the exhaust gas is desired. Conventionally, as a trial of heightening the $NO_x$ purification ratio, a exhaust gas purification system using a plasma reactor in combination with the $NO_x$ selective reduction catalyst is known (for example, from a 19th row in a left column of page 3 to a 25th row in a right column and FIG. 1 of page 5 of Japanese patent laid open publication Hei 6-99031). However, in the exhaust gas purification system, although the $NO_x$ purification ratio is heightened in the $NO_x$ selective reduction catalyst by an exhaust gas being reformed with the plasma reactor, such a problem that the $NO_x$ purification temperature becomes high does not still be solved. In addition, in applying the exhaust gas purification system to a diesel engine with a few unburned HC in an exhaust gas, although a reducing agent such as an HC needed for reforming the exhaust gas must be added to the exhaust gas, the HC must be continued to be added in order to maintain a predetermined $NO_x$ purification ratio in the purification system. Accordingly, the purification system has a problem that a loss of fuel which becomes a supply source of the HC occurs.

On the other hand, an exhaust gas purification system using the plasma reactor and $NO_x$ adsorptive catalyst in combination with the $NO_x$ selective reduction catalyst (for example, from a 34th row in a left column of page 3 to a 48th row in a right column of page 5 and FIG. 2 of Japanese patent laid open publication 2001-182525) is known.

The exhaust gas purification system is configured so that until a temperature of the $NO_x$ selective reduction catalyst reaches the $NO_x$ purification temperature (herein after simply referred to as purification temperature) after a start of an engine, the plasma reactor converts $NO_x$ other than $NO_2$ in an exhaust gas to $NO_2$; and the $NO_x$ adsorptive catalyst adsorbs the $NO_2$. And after a temperature of the $NO_x$ selective reduction catalyst reaches the purification temperature, the plasma reactor is made to be off, and the $NO_x$ in the exhaust gas continuously being sent in and $NO_2$ desorbed from $NO_x$ adsorptive catalyst are designed to be purified by the $NO_x$ selective reduction catalyst. Accordingly, the exhaust gas purification system enables the $NO_x$ to evade itself being discharged in the atmosphere after the start of the engine until the $NO_x$ selective reduction catalyst reaches the purification temperature.

However, the exhaust gas purification system needs a $NO_x$ selective reduction catalyst which can purify the $NO_x$ within an exhaust gas temperature of a diesel engine, and taking into consideration that the exhaust gas temperature of the diesel engine is comparatively low, there exists a problem that high $NO_x$ purification performance cannot be expected. Resultingly, the exhaust gas purification system cannot efficiently purify the $NO_x$.

SUMMARY OF THE INVENTION

An exemplary object of the present invention is to provide an exhaust gas purification system which can efficiently purify the $NO_x$ in an exhaust gas.

A first aspect of an gas purification system of the invention is a gas purification system equipped from an upstream side toward downstream side through which an exhaust gas flows with a plasma reactor and a catalyst unit charged with a catalyst acting on the $NO_x$ in the exhaust gas in this order; and equipped with a reducing agent supplying device supplying a reducing agent at the upstream side of the plasma reactor, wherein the reducing agent has an $NO_2$ adsorptive catalyst layer and $NO_2$ selective reduction catalyst layer contacting the $NO_2$ adsorptive catalyst layer.

In the gas purification system if the exhaust gas including the $NO_x$ passes the plasma reactor, $NO_x$ other than $NO_2$ is converted to $NO_2$. On the other hand, when the $NO_2$ selective reduction catalyst layer does not still reach a purification temperature of the $NO_2$ after a start of an engine, the $NO_2$ is adsorbed to the $NO_2$ adsorptive catalyst layer at the catalyst unit. Thus, the gas purification system enables an amount of $NO_2$ discharge to be reduced even when the $NO_2$ selective reduction catalyst layer does not still reach the purification temperature.

In addition, in the gas purification system, when the $NO_2$ selective reduction catalyst layer does not still reach the purification temperature, the $NO_2$ discharge can be prevented, thereby a supply of a reducing agent needed for the purification of the $NO_x$ can be stopped. Thus, the gas purification system enables a usage amount of the reducing agent to be reduced.

And in the exhaust gas purification system, if the reducing agent is supplied from the reducing agent supplying device when a temperature of the $NO_2$ selective reduction catalyst layer is heightened with heat of an introduced exhaust gas, the reducing agent is excited by the plasma reactor, and reaching the catalyst unit, is taken in the $NO_2$ selective reduction catalyst layer. On the other hand, $NO_2$ adsorbed to the $NO_2$ adsorptive catalyst layer thermally diffuses in a vicinity of a contact surface at a side of the $NO_2$ selective reduction catalyst layer through the contact surface with the $NO_2$ selective reduction catalyst layer. Then, the $NO_2$ is dissolved and purified by reacting to the reducing agent in the $NO_2$ selective reduction catalyst layer.

At this time, in the $NO_2$ selective reduction catalyst layer $NO_2$ is consumed by its dissolution, so a concentration slant of $NO_2$ is formed between the $NO_2$ adsorptive catalyst layer and $NO_2$ selective reduction catalyst layer. Accordingly, $NO_2$ adsorbed to the $NO_2$ adsorptive catalyst layer efficiently moves to the $NO_2$ selective reduction catalyst layer and is dissolved. As a result, the exhaust gas purification system efficiently purifies the $NO_x$ in the exhaust gas.

A second aspect of an exhaust gas purification system of the invention is, in the first aspect of the exhaust gas purification system of the invention, characterized in that the $NO_2$ selective reduction catalyst layer is disposed on a surface of the catalyst and the $NO_2$ adsorptive catalyst layer is disposed inside the $NO_2$ selective reduction catalyst layer.

The exhaust gas purification system enables the $NO_2$ selective reduction catalyst layer to be efficiently exposed to an exhaust gas introduced in the purification system because the catalyst layer is positioned at a surface side. Thus, the exhaust gas purification system enables $NO_2$ in an exhaust gas to be efficiently dissolved when a temperature of the $NO_2$ selective reduction catalyst layer is heightened till a purification temperature.

A third aspect of an exhaust gas purification system of the invention is characterized in that the $NO_2$ adsorptive catalyst layer is a porous support to be made to support at least one kind of alkali metal, alkali earth metal, and rare earth metal and the $NO_2$ selective reduction catalyst layer is the porous support to be made to support silver.

The exhaust gas purification system enables an $NO_2$ purification ratio to be more heightened because the $NO_2$ adsorptive catalyst layer is composed of the porous support and therefore an $NO_2$ adsorption to the $NO_2$ adsorptive catalyst layer, an $NO_2$ movement from the $NO_2$ adsorptive catalyst layer to the $NO_2$ selective reduction catalyst layer, and a discharge of an $NO_2$ dissolved matter from the $NO_2$ selective reduction catalyst layer are favorably performed.

A fourth aspect of an exhaust gas purification system of the invention is, in the second or third aspect of the exhaust gas purification system of the invention, characterized in that: the $NO_2$ adsorptive catalyst layer is stacked on an inner wall surface of narrow porosities of a support body with a plurality of the narrow porosities, and mass of the $NO_2$ adsorptive catalyst layer per unit volume of the narrow porosities is not less than 50 g/liter and not more than 100 g/liter; and the $NO_2$ selective reduction catalyst layer is stacked on the $NO_2$ adsorptive catalyst layer, and mass of the $NO_2$ selective reduction catalyst layer per unit volume of the narrow porosities is not less than 100 g/liter and not more than 250 g/liter.

The exhaust gas purification system enables an $NO_2$ adsorption ratio in the $NO_2$ adsorptive catalyst layer to be more heightened by setting the mass of the $NO_2$ adsorptive catalyst layer per unit volume of the narrow porosities to be not less than 50 g/liter and not more than 100 g/liter. In addition, the purification system enables an $NO_2$ purification ratio in the $NO_2$ selective reduction catalyst layer to be more heightened by setting the mass of the $NO_2$ selective reduction catalyst layer per unit volume of the narrow porosities to be not less than 100 g/liter and not more than 250 g/liter.

DESCRIPTION OF THE PREFERRED EMBODIMENTS

Hereinafter, one of the embodiments of an exhaust gas purification system related to the present invention will be described in detail, referring to FIGS. 1 to 4 as needed.

Figure 1:
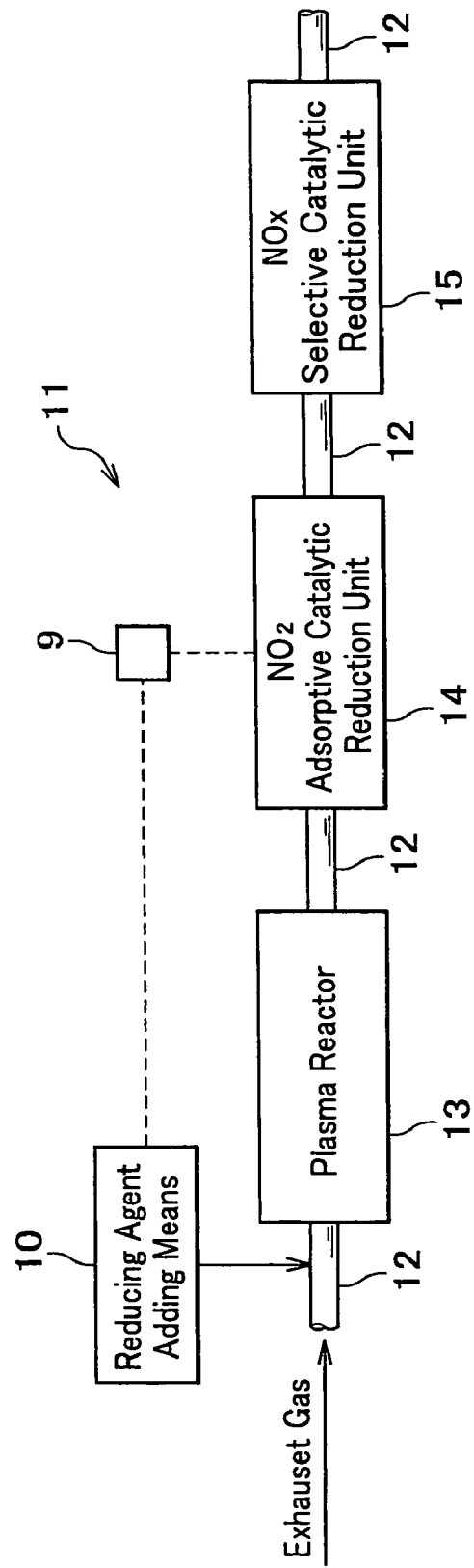
FIG. 1 is a block diagram of an exhaust gas purification system related to the embodiment of the present invention.

As shown in FIG. 1, an exhaust gas purification system 11 is equipped from an upstream side toward downstream side of an exhaust pipe 12 with a plasma reactor 13, an $NO_2$ adsorptive reduction catalyst unit 14, and a $NO_x$ selective reduction catalyst unit 15 in this order. In addition, the purification system 11 is equipped with a reducing agent adding means 10 supplying a reducing agent in the exhaust pipe 12 disposed at the upstream side of the plasma reactor 13 and a reducing agent supply controlling device 9 connected with the reducing agent adding means 10 and $NO_2$ adsorptive reduction catalyst unit 14. Meanwhile, the $NO_2$ adsorptive reduction catalyst unit 14 corresponds to a "catalyst unit" in the claims.

[Plasma Reactor]

The plasma reactor 13 converts $NO_x$ other than $NO_2$ contained in an exhaust gas generated burning fuel under an excess oxygen atmosphere to $NO_2$ with plasma. In addition, the plasma reactor 13 produces an active kind such as a radical by exciting a reducing agent with the plasma, and using its oxidizing ability, can also oxidize a PM (particulate matter). Although the plasma reactor 13 is not specifically limited if it achieves an object of the invention, corona discharge, pulse discharge, and barrier discharge types are applicable, and also taking the oxidizing ability of the PM into consideration, the barrier discharge type of plasma reactor is preferable. Meanwhile, although in FIG. 1 one plasma reactor 13 is disposed, not less than two plasma reactors 13 may be disposed serially and parallel.

[$NO_2$ Adsorptive Reduction Catalyst Unit]

Figure 2:
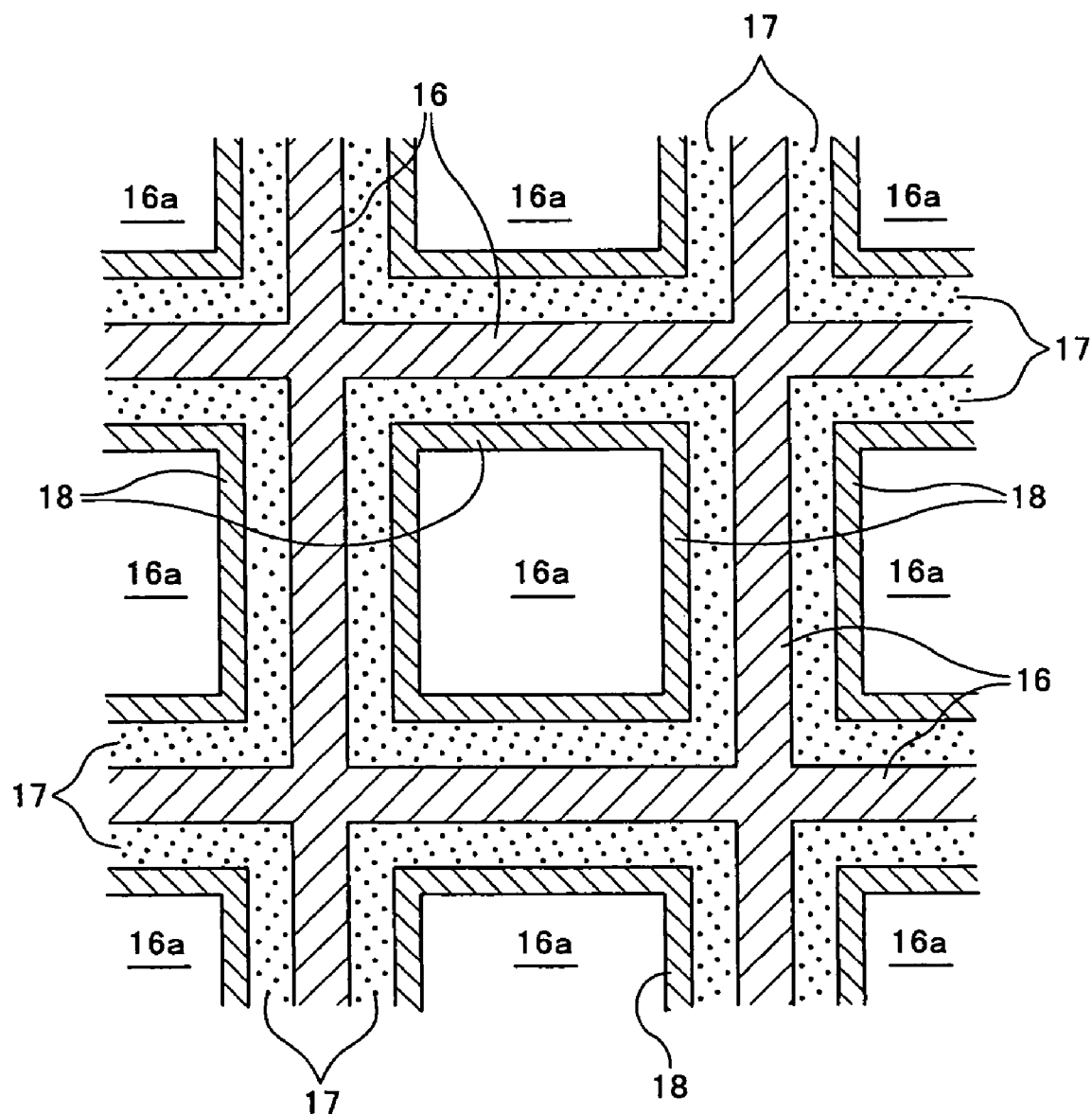
FIG. 2 is a partial section drawing showing a catalyst component charged in an $NO_2$ adsorptive reduction catalyst unit used for the exhaust gas purification system of FIG. 1.

The $NO_2$ adsorptive reduction catalyst unit 14 is equipped with a catalyst component making a support body with a plurality of narrow porosities support a catalyst. The catalyst component is, as shown in FIG. 2, equipped with a support body 16, an $NO_2$ adsorptive catalyst layer 17 stacked on a wall surface surrounding narrow porosities 16a (hereinafter referred to as inner wall surface of the narrow porosities 16a) of the support body 16, and an $NO_2$ selective reduction catalyst layer 18 stacked on the $NO_2$ adsorptive catalyst layer 17.

The support body 16 is not specifically limited if it has a plurality of the narrow porosities, and for example; a porous body such as a cordierite, mullite, and silicon carbide (SiC); a honeycomb form shaped with a metal sheet such as stainless steel, and the like are cited.

As the $NO_2$ adsorptive catalyst layer 17, for example, a porous support made to support at least one kind of alkali metal, alkali earth metal, and rare earth metal is cited.

As the porous supports used for the $NO_2$ adsorptive catalyst layer 17, for example, respective porous sintered bodies of an aluminum, silica, and silica/alumina; a zeolite, and the like are cited.

As the alkali metal, for example, a lithium, natrium, kalium, and the like are cited; as the alkali earth metal, for example, a beryllium, magnesium, calcium, strontium, and barium are cited; and as the rare earth metal, for example, a scandium, yttrium, lanthanum, cerium, and the like are cited.

A concentration of the alkali earth metal and rare earth metal in such the $NO_2$ adsorptive catalyst layer 17 can be set as needed corresponding to a concentration of $NO_x$ in an exhaust gas to be treated.

A thickness of the $NO_2$ adsorptive catalyst layer 17 formed on the inner wall surface of the narrow porosities is preferable to be not less than 50 g/liter and not more than 100 g/liter, being converted to the mass of the $NO_2$ adsorptive catalyst layer 17 per unit volume of the narrow porosities 16a. Meanwhile, if the thickness of the $NO_2$ adsorptive catalyst layer 17 becomes less than 50 g/liter, in some case a sufficient amount of $NO_2$ cannot be adsorbed to the layer 17. In addition, if the thickness of the layer 17 becomes more than 100 g/liter, the $NO_2$ selective reduction catalyst layer 18 stacked on the layer 17 must be thinned in order to ensure a predetermined opening degree of the catalyst component.

As a result, in some case the $NO_x$ in the exhaust gas and $NO_2$ desorbed from the layer 17 cannot be sufficiently purified.

As the $NO_2$ selective reduction catalyst layer 18, a porous support is preferable to be made to support silver. As the porous support used for the $NO_2$ selective reduction catalyst layer 18, one similar to the carrier used for the $NO_2$ adsorptive catalyst layer 17 is cited.

Silver is a catalyst prompting a dissolving reaction of $NO_x$ by a reducing agent. The contained amount of silver is preferable to be in a range of over 1.5 to below 5 mass percent for mass of the $NO_2$ selective reduction catalyst layer 18 and further preferable to be in the range of over 2.0 to below 4 mass percent.

If the silver concentration becomes less than 1.5 mass percent, in some case purification ratios of $NO_2$ sent out from the plasma reactor 13, $NO_x$ not converted to $NO_2$ in the plasma reactor 13, and $NO_2$ desorbed from the $NO_2$ adsorptive catalyst layer 17 become lowered. On the other hand, if the silver concentration becomes more than 5 mass percent, a reducing agent described later is also consumed by priority, whereby in some case a purification ratio of $NO_x$ becomes lowered.

Figure 3:
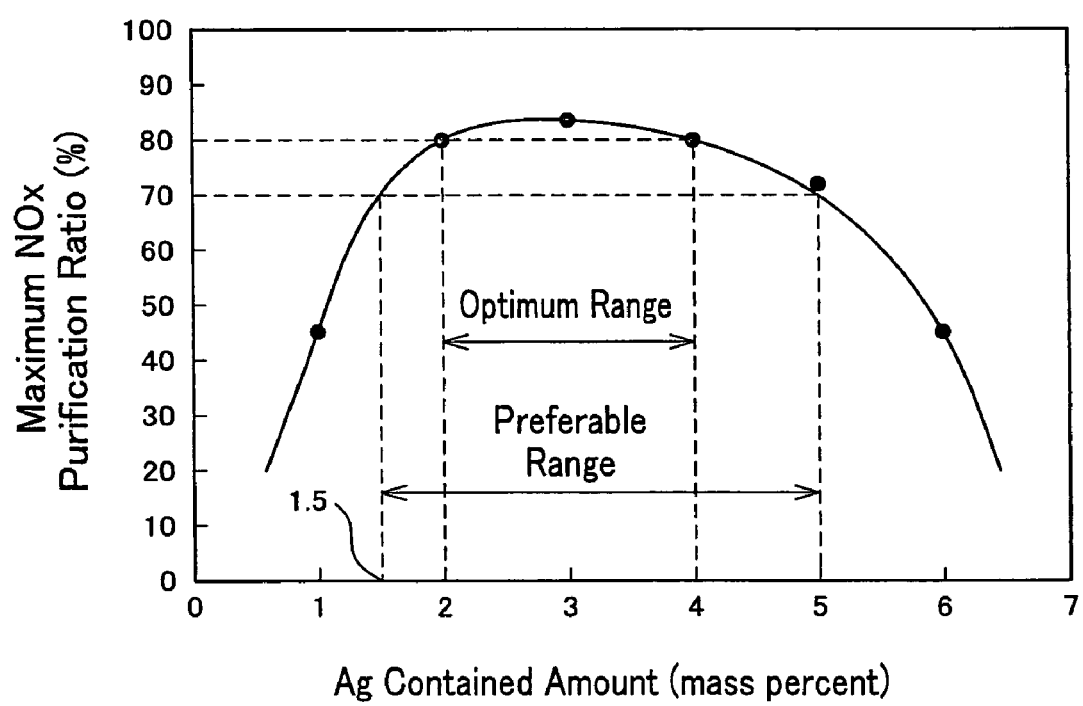
FIG. 3 is a graph showing a relationship between a contained amount of silver in an $NO_2$ selective reduction catalyst layer and a $NO_x$ purification ratio.

This is attributable to a tendency that as shown in FIG. 3, if the contained amount of silver becomes less than 1.5 mass percent, a reaction place of $NO_x$ becomes less, the purification ratio of the $NO_x$ becomes less than 70%, and an effective purification of the $NO_x$ cannot be desired. On the other hand, if the contained amount of silver becomes more than 5 mass percent, a reducing agent is also consumed by priority, and resultingly, the purification ratio of the $NO_x$ becomes less than 70%, whereby there exists the tendency that the effective purification of the $NO_x$ cannot be desired. On the other hand, if the contained amount of silver is not less than 2.0 mass percent and not more than 4 mass percent, the purification ratio of the NO becomes not less than 80%, so the purification can be favorably performed.

Meanwhile, a total thickness of the $NO_2$ adsorptive catalyst layer 17 and $NO_2$ selective reduction catalyst layer 18 is preferable to be not less than 150 g/liter and not more than 350 g/liter, being converted to total mass of the $NO_2$ adsorptive catalyst layer 17 and $NO_2$ selective reduction catalyst layer 18 per unit volume of the narrow porosities 16a of the support body 16.

[$NO_x$ Selective Reduction Catalyst Unit]

Figure 4:
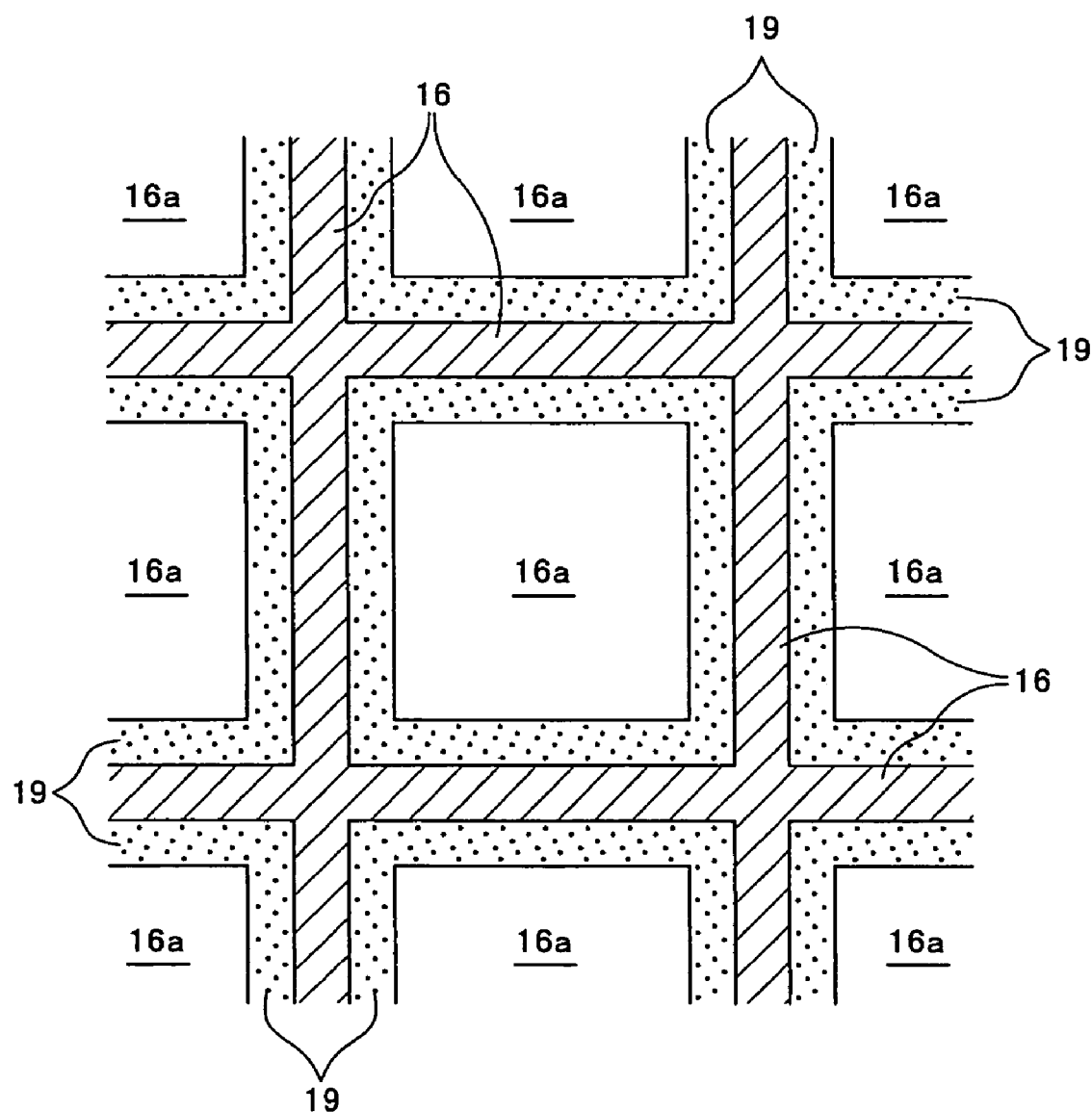
FIG. 4 is a partial section drawing showing a catalyst component charged in a $NO_x$ selective reduction catalyst unit used for the exhaust gas purification system of FIG. 1.

A $NO_x$ selective reduction catalyst unit 15 is equipped with a catalyst component making a support body with a plurality of narrow porosities support a catalyst. The catalyst component is, as shown in FIG. 4, equipped with a support body 16 and $NO_x$ selective reduction catalyst layer 19 stacked on an inner wall surface of narrow porosities 16a surrounding the support body 16. The $NO_x$ selective reduction catalyst unit 15 is a unit to purify residual $NO_x$ contained in an exhaust gas having passed the $NO_2$ adsorptive reduction catalyst unit 14.

As the support body 16, a similar body used for the $NO_2$ adsorptive reduction catalyst unit 14 can be used.

The $NO_x$ selective reduction catalyst layer 19 can be composed same as the $NO_2$ selective reduction catalyst layer 18 used for the $NO_2$ adsorptive reduction catalyst unit 14 and its thickness is preferable to be not less than 150 g/liter and not more than 350 g/liter, being converted to mass of the $NO_x$ selective reduction catalyst layer 19 per unit volume of the narrow porosities 16a of the support body 16. Meanwhile, the $NO_x$ selective reduction catalyst layer 19 corresponds to a "$NO_x$ selective reduction catalyst" in the claims.

[Reducing Agent Supplying Device]

A reducing agent adding means 10 is a means to supply a reducing agent at the upstream side of the plasma reactor 13. The reducing agent adding means 10 can be composed of, for example, a known fuel injection mechanism used to inject fuel in a pipe of an engine, a post injection mechanism, and the like.

In addition, the reducing agent adding means 10 is composed so as to supply the reducing agent by a reducing agent supplying command signal output from a reducing agent supply controlling device 9 described next and to stop the supply of the reducing agent by a reducing agent supplying stop command signal output from the reducing agent supply controlling device 9.

Meanwhile, as the reducing agent supplied from the reducing agent adding means 10, for example, a hydrocarbon gas such as a fuel for a diesel engine (light oil) may be used.

[Reducing Agent Supply Controlling Device]

The reducing agent supply controlling device 9 is electrically connected with the reducing agent adding means 10 and $NO_2$ adsorptive reduction catalyst unit 14 (see FIG. 1). The controlling device 9 is composed so that the reducing agent adding means 10 controls a timing to supply a reducing agent, based on a temperature detecting signal output from a temperature sensor not shown in the drawing and provided at the $NO_2$ adsorptive reduction catalyst unit 14. To be more precise, the controlling device 9 is composed so that when judging that a temperature of the $NO_2$ selective reduction catalyst layer 18 specified based on the temperature detecting signal does not reach a $NO_x$ purification temperature of the layer 18, it outputs a reducing agent supplying stop command signal toward the reducing agent adding means 10; and on the contrary when judging that the temperature of the layer 18 reaches the purification temperature, it outputs a reducing agent supplying command signal.

Next, while operation of an exhaust gas purification system related to the invention is described referring to FIGS. 5 and 6 as needed, an exhaust gas purifying method using the exhaust gas purification system will be described.

Firstly, in the exhaust gas purification system 11 a power source of the plasma reactor 13 is turned on by starting an engine and $NO_x$ other than $NO_2$ in an exhaust gas is converted to $NO_2$. Then the reducing agent supplying device 9 judges whether or not a temperature of the $NO_2$ selective reduction catalyst layer 18 specified based on a temperature detecting signal reaches the $NO_x$ purification temperature. Here, assuming that the temperature of the $NO_2$ selective reduction catalyst layer 18 does not reach the $NO_x$ purification temperature and further proceeding description, the reducing agent supplying device 9 outputs a reducing agent supplying stop command signal toward the reducing agent adding means 10. And the adding means 10 receiving the reducing agent supplying stop command signal does not supply a reducing agent. That is, a state of the adding means 10 before the start of the engine is maintained.

Figure 5:
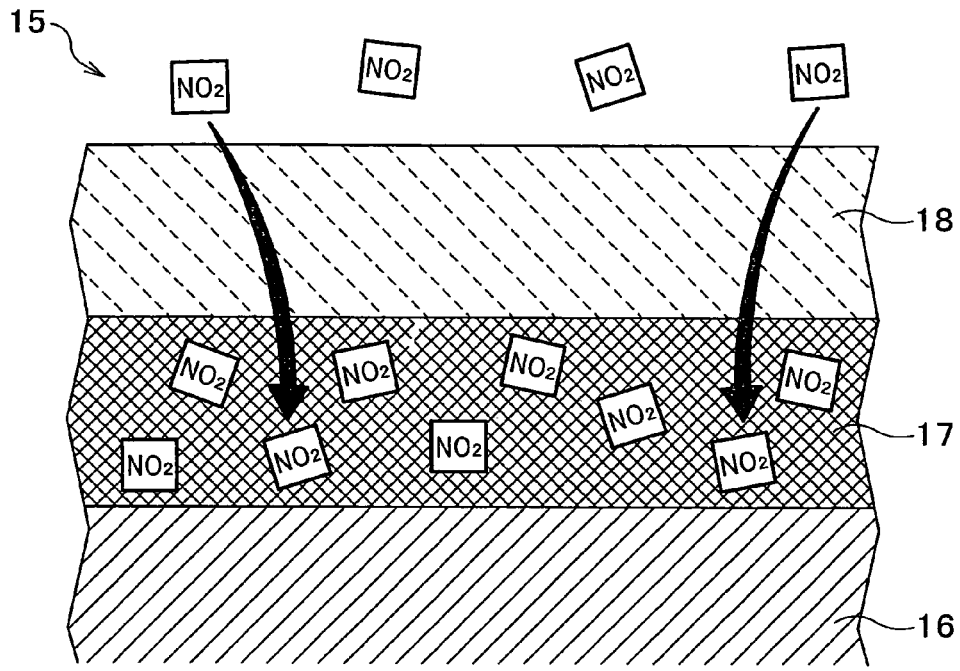
FIG. 5 is a conceptual drawing showing a behavior of exhaust gas compositions before an $NO_2$ selective reduction catalyst layer reaches a purification temperature.

On the other hand, if $NO_2$ contained in an exhaust gas passing the plasma reactor 13 reaches the $NO_2$ adsorptive reduction catalyst unit 14, it moves, as shown in FIG. 5, to the $NO_2$ adsorptive catalyst layer 17 through the $NO_2$ selective reduction catalyst layer 18 formed on the support body 16. Then, the moved $NO_2$ is adsorbed to the $NO_2$ adsorptive catalyst layer 17.

Next, after the start of the engine when a temperature of the exhaust gas is heightened, thereby the $NO_2$ selective reduction catalyst layer 18 reaching the purification temperature, the reducing agent supplying device 9 outputs a reducing agent supplying command signal toward the reducing agent adding means 10 based on a temperature detecting signal from the temperature sensor. And the reducing agent adding means 10 receiving the reducing agent supplying command signal supplies the reducing agent (HC) in the pipe 12 at the upstream side of the plasma reactor 13. The supplied reducing agent (HC) is excited at the plasma reactor 13 and sent out from the plasma reactor 13 toward the $NO_2$ adsorptive reduction catalyst unit 14.

Figure 6:
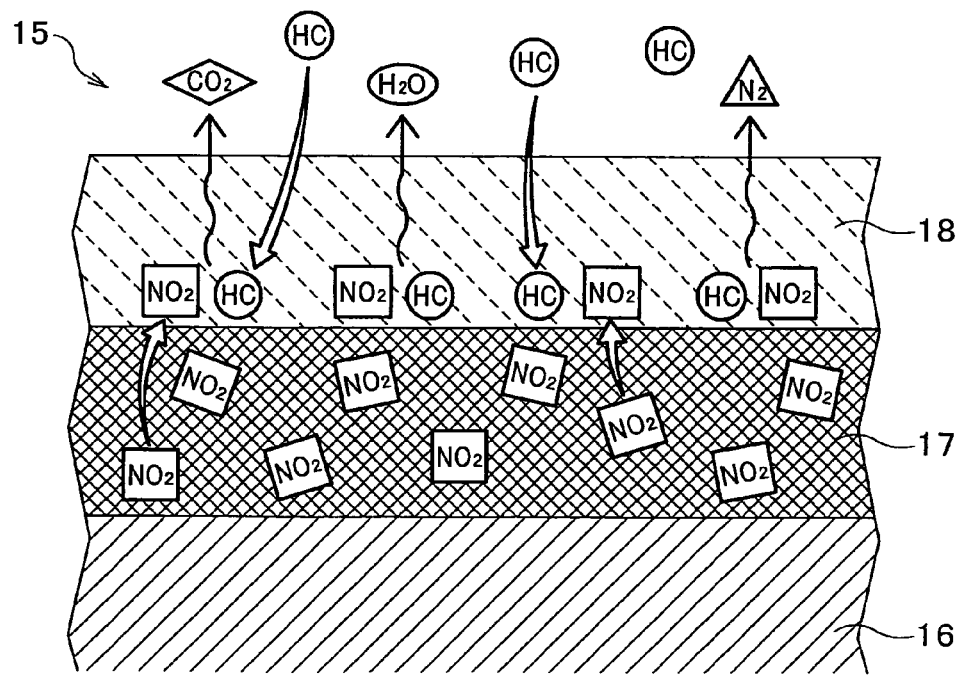
FIG. 6 is a conceptual drawing showing a behavior of exhaust gas compositions after an $NO_2$ selective reduction catalyst layer reaches a purification temperature.

On the other hand, the reducing agent (HC) reaching the $NO_2$ adsorptive reduction catalyst unit 14 is, as shown in FIG. 6, taken in the $NO_2$ selective reduction catalyst layer 18. And if it reaches in a vicinity of a contact surface of the $NO_2$ selective reduction catalyst layer 18 and $NO_2$ adsorptive catalyst layer 17, thermally diffused $NO_2$ from them to the vicinity of the contact surface dissolves by reacting to the reducing agent (HC) and produces a nitrogen gas ($N_2$), water ($H_2O$), and carbon dioxide ($CO_2$) in the $NO_2$ selective reduction catalyst layer 18. Then, these nitrogen gas ($N_2$), water ($H_2O$), and carbon dioxide ($CO_2$) are discharged in the exhaust gas. On the other hand, if the $NO_2$ is consumed in the vicinity of the contact surface of the $NO_2$ selective reduction catalyst layer 18 and $NO_2$ adsorptive catalyst layer 17, a concentration slant of the $NO_2$ is formed between them. As a result, $NO_2$ adsorbed to the $NO_2$ adsorptive catalyst layer 17 efficiently moves toward the $NO_2$ selective reduction catalyst layer 18, and as describe above, dissolves by acting with the reducing agent (HC), thereby being purified.

In addition, in the exhaust gas purification system 11 the plasma reactor 13 converts $NO_x$ in the exhaust gas continuously discharged from the engine to $NO_2$. When the $NO_2$ reaches the $NO_2$ adsorptive reduction catalyst unit 14 together with the reducing agent (HC), the $NO_2$ and reducing agent (HC) react in the $NO_2$ selective reduction catalyst layer 18 having reached the purification temperature. And as described above, the $NO_2$ and reducing agent (HC) are dissolved into the nitrogen gas ($N_2$), water ($H_2O$), and carbon dioxide ($CO_2$), thereby the $NO_2$ being purified.

In addition, in the exhaust gas purification system 11 related to the invention, when an exhaust gas passing the $NO_2$ adsorptive reduction catalyst unit 14 reaches the $NO_x$ selective reduction catalyst unit 15, a residual reducing agent and $NO_x$ contained in the exhaust gas, that is, $NO_2$ not dissolved in the $NO_2$ selective reduction catalyst layer 18 and $NO_x$ not converted in the plasma reactor 13, contact the $NO_x$ selective reduction catalyst layer 19 (see FIG. 4) and are taken in the layer 19. Then, these residual reducing agent and $NO_x$ react each other, these are dissolved into the nitrogen gas ($N_2$), water ($H_2O$), and carbon dioxide ($CO_2$).

According to such the exhaust gas purification system 11, the $NO_x$ other than $NO_2$ is converted in the plasma reactor 13 to $NO_2$, and after the start of an engine when the $NO_2$ selective reduction catalyst layer 18 does not still reach an $NO_2$ purification temperature, $NO_2$ is adsorbed to the $NO_2$ adsorptive catalyst layer 17. Thus, the purification system 11 enables a discharged amount of $NO_2$ to be reduced even when the $NO_2$ selective reduction catalyst layer 18 does not still reach the purification temperature.

Moreover, the exhaust gas purification system 11 enables a reducing agent supply needed for the purification of the $NO_x$ to be stopped because when the $NO_2$ selective reduction catalyst layer 18 does not still reach the purification temperature, the system 11 can prevent a $NO_x$ discharge by adsorbing converted $NO_2$. Accordingly, the purification system 11 enables a usage amount of a reducing agent to be reduced.

And in the exhaust gas purification system 11 when a temperature of the $NO_2$ selective reduction catalyst layer 18 is heightened till the purification temperature with heat of an introduced exhaust gas, thermally diffused $NO_2$ from the $NO_2$ adsorptive catalyst layer 17 toward the $NO_2$ selective reduction catalyst layer 18 reacts with a reducing agent supplied from the reducing agent adding means 10 and dissolves. In the $NO_2$ selective reduction catalyst layer 18, $NO_2$ is consumed by the $NO_2$ dissolution, so the concentration slant of $NO_2$ is formed between the $NO_2$ adsorptive catalyst layer 17 and $NO_2$ selective reduction catalyst layer 18. Thus, $NO_2$ adsorbed to the $NO_2$ adsorptive catalyst layer 17 efficiently moves to the $NO_2$ selective reduction catalyst layer 18, whereby no adsorbed $NO_2$ accumulates in the $NO_2$ adsorptive catalyst layer 17. Therefore, an $NO_2$ amount newly adsorbed to the $NO_2$ adsorptive catalyst layer 17 increases, thereby the purification ratio of $NO_2$ increasing.

In the exhaust gas purification system 11 because the $NO_2$ selective reduction catalyst layer 18 is positioned at a surface side, it is efficiently exposed to an exhaust gas introduced into the purification system 11. Thus, the purification system 11 enables $NO_2$ in the exhaust gas to be efficiently dissolved when the temperature of the $NO_2$ selective reduction catalyst layer 18 is heightened till the purification temperature.

The purification system 11 enables the $NO_2$ purification ratio to be more heightened because the $NO_2$ adsorptive catalyst layer 17 is composed of the porous support and therefore an $NO_2$ adsorption to the $NO_2$ adsorptive catalyst layer 17, an $NO_2$ movement from the $NO_2$ adsorptive catalyst layer 17 to the $NO_2$ selective reduction catalyst layer 18, and a discharge of an $NO_2$ dissolved matter from the $NO_2$ selective reduction catalyst layer 18 are favorably performed.

According to the purification system 11, the $NO_2$ adsorption ratio in the $NO_2$ adsorptive catalyst layer 17 is more heightened by the mass of the layer 17 per unit volume of the narrow porosities 16a being set to be not less than 50 g/liter and not more than 150 g/liter. In addition, the $NO_2$ purification ratio in the $NO_2$ selective reduction catalyst layer 18 is more heightened by the mass of the layer 18 per unit volume of the narrow porosities 16a being set to be not less than 100 g/liter and not more than 250 g/liter.

Moreover, according to the purification system 11, the $NO_2$ purification ratio in the $NO_2$ selective reduction catalyst layer 18 is more heightened by a silver support amount of the layer 18 being set to be not less than 1.5 mass percent and not more than 5 mass percent for the mass of the layer 18.

Still moreover, according to the purification system 11, the $NO_2$ purification ratio is more heightened because $NO_2$ not dissolved in the $NO_2$ selective reduction catalyst layer 18 and the $NO_x$ not converted in the plasma reactor 13 to $NO_2$ are dissolved in the $NO_x$ selective reduction catalyst unit 15.

In addition, according to the purification system 11, a $NO_x$ purification ratio in the $NO_x$ selective reduction catalyst layer 19 is further heightened by the silver support amount of the layer 19 being set to be not less than 1.5 mass percent and not more than 5 mass percent.

EMBODIMENTS

Hereinafter the invention will be described in more detail based on embodiments.

a. Embodiment 1

(1) Manufacture of Catalyst Component A Used for $NO_x$ Adsorption Reduction Catalyst Unit 100 g of Na-USY type of zeolite, 133 g of kalium nitrate, and 1000 g of pure water were put in a separable flask, stirred for 14 hours while being heated up to 90 degrees Celsius, and filtrated. And after an obtained solid matter being washed with the pure water, it was dried at 150 degrees Celsius for two hours, and then baked at 400 degrees Celsius for 12 hours in a muffle furnace, thereby a K-ion exchange USY type of zeolite powder having been obtained. Meanwhile, an ion exchange ratio of kalium of the zeolite powder was 75%.

Next, 90 g of the zeolite powder, 50 g of an alumina binder ($Al_2O_3$ concentration: 20 mass percent), and 150 g of the pure water were put in a pot together with an alumina ball, and dryly pulverized for 12 hours, thereby a slurry catalyst having been adjusted.

In the obtained slurry catalyst was dipped a cordierite honeycomb support body of which honeycomb volume was 30 milliliter, a density per unit area of narrow porosities was 62.0 cell/$cm^2$ (400 cell/$inch^2$), and an aperture diameter was 152 μm (six mil). Then, the honeycomb support body was taken out of the slurry catalyst, and after excess slurry catalyst having been removed by air spray, the honeycomb support body was dried at 150 degrees Celsius for one hour. And these procedures having been repeated, a predetermined thickness of the $NO_2$ adsorptive catalyst layer 17 (see FIG. 2) on an inner wall surface of the narrow porosities of the honeycomb support body was formed, and then it was baked in the muffle furnace at 500 degrees Celsius for two hours. Meanwhile, a thickness of the $NO_2$ adsorptive catalyst layer 17 (wash-coat) formed by a wash-coat method was 50 g/liter, converted to mass of an $NO_2$ adsorptive catalyst layer per unit volume of the narrow porosities. Hereinafter the conversion thickness is simply called a "wash-coat amount."

Next, 4.72 g of silver nitrate, 130 g of bemite, and 1000 g of the pure water were put in an eggplant shape flask, excess water was removed with a rotary evaporator, and then an obtained solid matter was dried at 200 degrees Celsius for two hours, and then was baked in the muffle furnace at 600 degrees Celsius for two hours, thereby silver/alumina catalyst powder having been obtained.

Next, 90 g of the silver/alumina catalyst powder, 50 g of the alumina binder ($Al_2O_3$ concentration: 20 mass percent), and 150 g of the pure water were put in a pot together with the alumina ball and dryly pulverized for 12 hours, thereby a slurry catalyst having been adjusted.

In the obtained slurry catalyst was dipped the honeycomb support body where the $NO_2$ adsorptive catalyst layer 17 was formed. Then, the honeycomb support body was taken out of the slurry catalyst, and after excess slurry catalyst having been removed by air spray, it was dried at 150 degrees Celsius for one hour. And these procedures having been repeated, the $NO_2$ selective reduction catalyst layer 18 (see FIG. 2) was formed on the $NO_2$ adsorptive catalyst layer 17 and then it was baked in the muffle furnace at 500 degrees Celsius for two hours, thereby the catalyst component A used for an $NO_2$ selective reduction catalyst unit having been manufactured. Meanwhile, a wash-coat amount of the $NO_2$ selective reduction catalyst layer 18 was 100 g/liter and an all wash-coat amount showing a total thickness of the $NO_2$ adsorptive catalyst layer 17 and $NO_2$ selective reduction catalyst layer 18 was 150 g/liter. In addition, a silver support amount (concentration) in the $NO_2$ selective reduction catalyst layer 18 was 4.1 g/liter (silver concentration for the wash-coat amount: 2.7 mass percent).

(2) Manufacture of Catalyst Component B Used for $NO_x$ Selective Reduction Catalyst Unit 4.72 g of silver nitrate, 130 g of bemite, and 1000 g of the pure water were put in an eggplant shape flask, excess water was removed with a rotary evaporator, an obtained solid matter was dried at 200 degrees Celsius for two hours, and it was baked in the muffle furnace for two hours, thereby silver/alumina catalyst powder having been obtained.

Next, 90 g of the silver/alumina catalyst powder, 50 g of the alumina binder ($Al_2O_3$ concentration: 20 mass percent), and 150 g of the pure water were put in a pot together with the alumina ball, and dryly pulverized for 12 hours, thereby a slurry catalyst having been adjusted.

In the obtained slurry catalyst was dipped the cordierite honeycomb support body of which honeycomb volume was 30 milliliter, a density per unit area of narrow porosities was 62.0 cell/$cm^2$ (400 cell/$inch^2$), and an aperture diameter was 152 μm (six mil). Then, the honeycomb support body was taken out of the slurry catalyst, and after excess slurry catalyst having been removed by air spray, the honeycomb support body was dried at 150 degrees Celsius for one hour. And these procedures having been repeated, a predetermined thickness of the $NO_x$ selective reduction catalyst layer 19 (see FIG. 4) was formed on the inner wall surface of the narrow porosities of the honeycomb support body, and then the honeycomb support body was baked in the muffle furnace at 500 degrees Celsius for two hours, thereby the catalyst component B used for a $NO_x$ selective reduction catalyst layer having been manufactured. Meanwhile, a wash-coat amount of the $NO_x$ selective reduction catalyst layer 19 was 150 g/liter. A silver support amount (concentration) in the $NO_x$ selective reduction catalyst layer 19 was 4.1 g/liter (silver concentration for the wash-coat amount: 2.7 mass percent).

(3) Configuration of Exhaust Gas Purification System

Figure 7A:
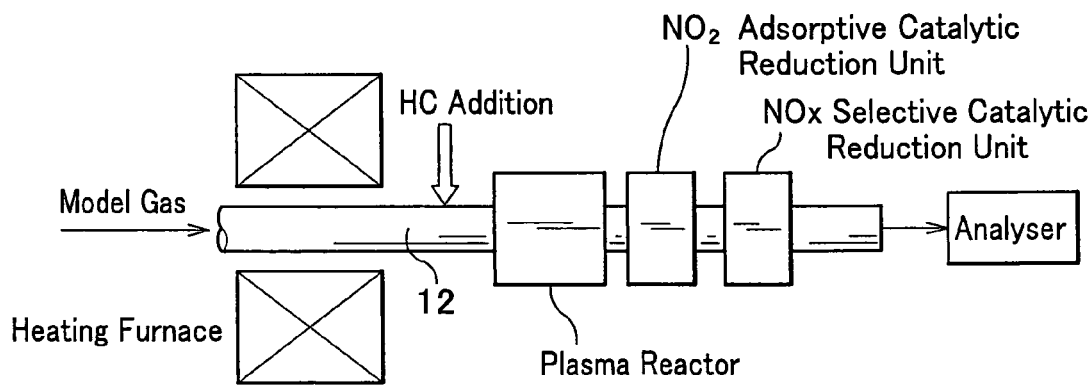
FIG. 7A is a conceptual drawing of an exhaust gas purification system of embodiments 1 to 5 and FIG. 7B is a conceptual drawing of an exhaust gas purification system of a comparison example.

A configuration of an exhaust gas purification system of an embodiment is 1 shown in FIG. 7A. The exhaust gas purification system is equipped from an upstream side toward downstream side of a pipe 12 with a plasma reactor, $NO_2$ adsorption reduction catalyst unit, and $NO_x$ selective reduction catalyst unit in this order. And at an upstream side of the plasma reactor is provided a heating furnace to heat a gas introduced into the purification system up to a predetermined temperature, at a discharge port is disposed an analyzer of gas compositions, and to the pipe 12 of the upstream side of the plasma reactor is designed to be added the reducing agent (HC) with a predetermined amount described below.

Figure 8:
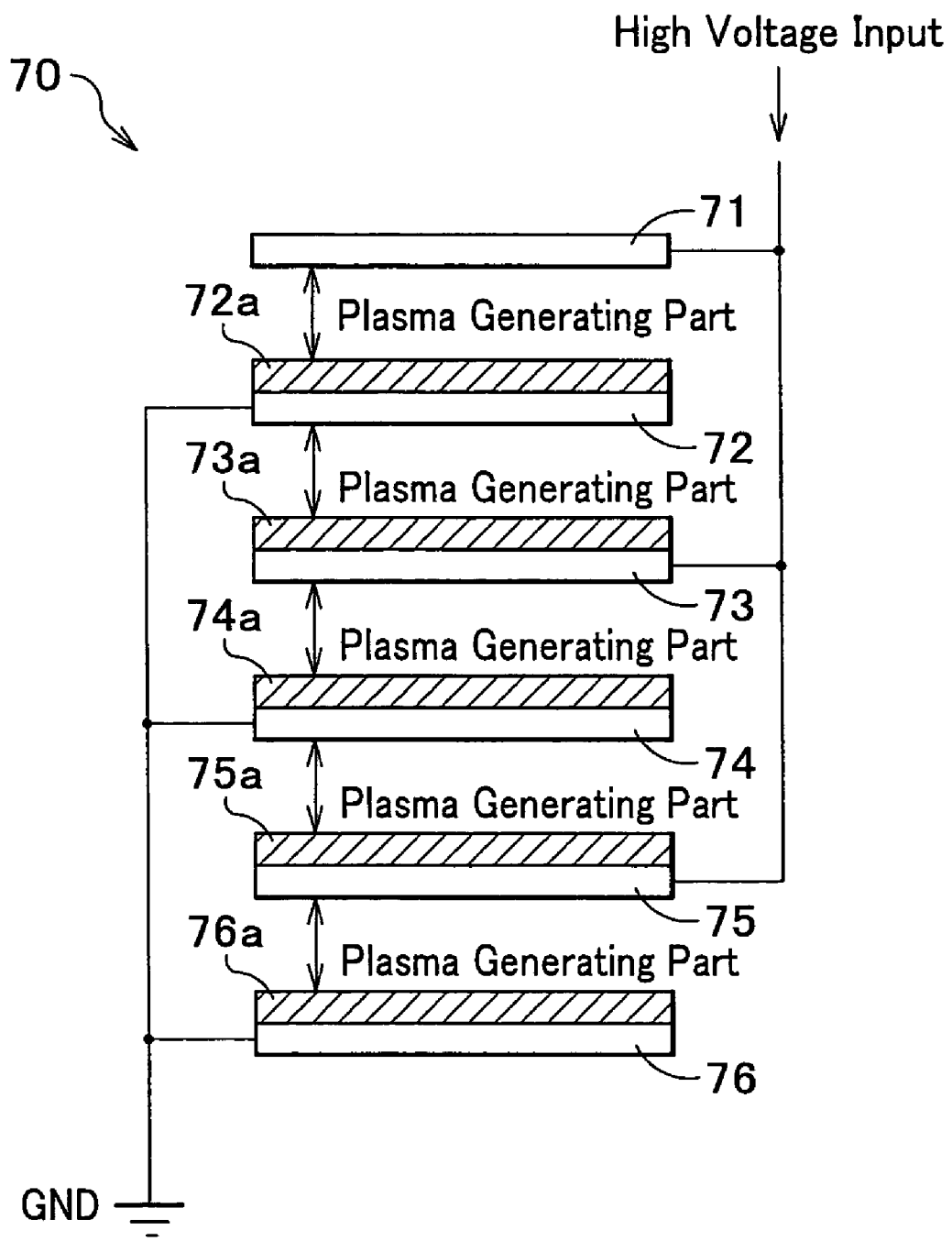
FIG. 8 is a schematic drawing of a plasma reactor used for the exhaust gas purification system of the embodiments 1 to 5.

In the plasma reactor used for the purification system, as shown in FIG. 8, surfaces at a side of a metal electrode 71 of metal electrodes 72, 73, 74, 75, and 76 out of the metal electrodes 71, 72, 73, 74, 75, and 76 parallel disposed at a predetermined distance are coated with dielectrics 72a, 73a, 74a, 75a, and 76a, respectively. The metal electrodes 71, 72, 73, 74, 75, and 76 are formed of SUS 316 sheet form body of 1.0 mm T×20 mm W×50 mm L. The dielectrics 72a, 73a, 74a, 75a, and 76a are formed of a thickness of 0.5 mm on the metal electrodes 72, 73, 74, 75, and 76. Meanwhile, distances between the metal electrode 71 and dielectric 72a, the metal electrode 72 and dielectric 73a, the metal electrode 73 and dielectric 74a, the metal electrode 74 and dielectric 75a, and the metal electrode 75 and dielectric 76a are designed to be 0.5 mm, respectively.

In a plasma reactor 70 an alternate current of 7.6 kV and 200 MHz of sine waves is designed to be input in the metal electrodes 71, 73, and 75 and plasma is designed to be generated between the dielectrics 72a, 73a, 74a, 75a, and 76a and the metal electrodes 71, 72, 73, 74, and 75 by grounding the metal electrodes 72, 74, and 76. Meanwhile, the embodiment is adjusted so that an electric field intensity and a power density become 7.6 kV/mm and 1.2 W/$cm^3$, respectively, by setting power to be 3.1 W when the alternate current is input in the metal electrodes 71, 73, and 75.

An $NO_2$ adsorptive reduction catalyst unit is composed by providing the catalyst component A manufactured in the embodiment 1 within a predetermined casing. In addition, a $NO_x$ selective reduction catalyst unit is composed by providing the catalyst component B manufactured in the embodiment 1 within a predetermined casing.

(4) Evaluation Test of Exhaust Gas Purification System

A following measurement test of an $NO_2$ adsorption ratio was performed using the exhaust gas purification system of the embodiment 1. In this evaluation test, the model gas A composed of 100 ppm of nitrogen monoxide (NO), 300 ppm (conversion to carbon) of propylene ($C_3H_6$), 1100 ppm of carbon monoxide (CO), four volume percent of carbon dioxide ($CO_2$), 15 volume percent of oxygen ($O_2$), four volume percent of water ($H_2O$), and balance of nitrogen ($N_2$) were used. Meanwhile, a concentration of each composition in the model gas A is a value at 25 degrees Celsius and 1013 hPa (one atmospheric pressure).

Figure 9:
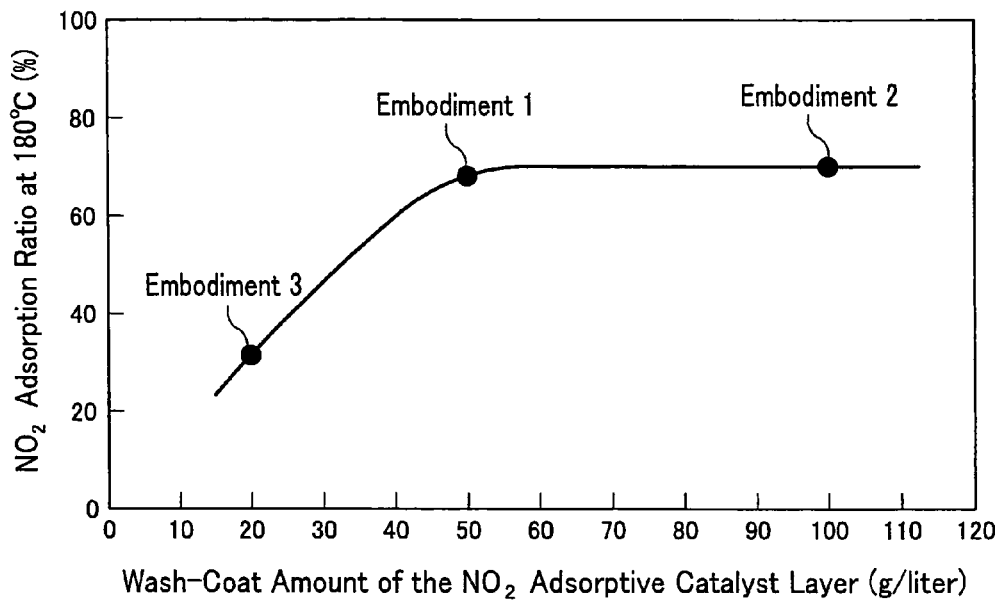
FIG. 9 is a graph showing a relationship between an $NO_2$ adsorption ratio and a wash-coat amount of an $NO_2$ adsorptive catalyst layer in the embodiments 1 to 3.

In the evaluation test, the model gas A maintained at 180 degrees Celsius was introduced into the exhaust gas purification system for 100 seconds and a $NO_x$ amount of a gas discharged from the purification system was measured with an analyzer (see FIG. 7A), thereby an $NO_2$ amount adsorbed to the $NO_2$ adsorptive catalyst layer having been calculated. And based on the $NO_2$ amount, an $NO_2$ adsorption ratio for NO contained in the model gas A introduced for 100 seconds was calculated. The result is shown in FIG. 9.

Figure 10:
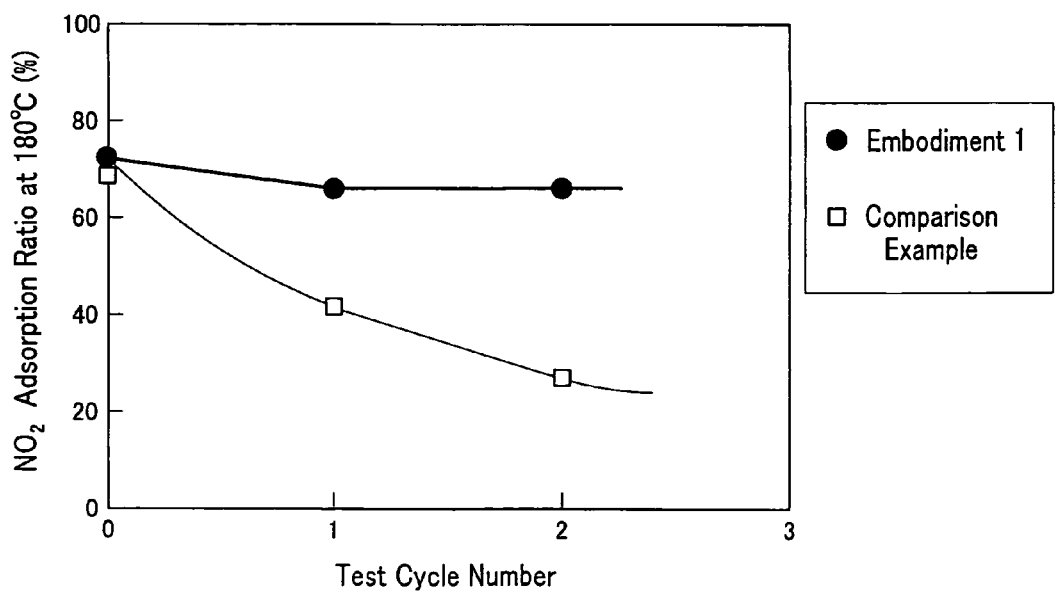
FIG. 10 is a graph showing a test result of a cycle test performed for the exhaust gas purification systems of the embodiment 1 and comparison example.

Next, a cycle test of the purification system was performed. In the cycle test similarly to the measurement test of the $NO_2$ adsorption ratio, after the model gas A maintained at 180 degrees Celsius having been introduced into the purification system for 100 seconds, the introduced model gas A was heated up to 350 degrees Celsius, and while the temperature of 350 degrees Celsius having been maintained, 2000 ppm (conversion to carbon) of normal hexadecane ($nC_{16}H_{34}$) was introduced into the purification system. Then, these procedures was made a cycle and it was repeated plural times, thereby the $NO_2$ adsorption ratio of each the cycle in the $NO_2$ adsorptive catalyst layer having been obtained. The result is shown in FIG. 10.

Next, a measurement test of a $NO_x$ purification ratio of the purification system was performed. In this evaluation test, the model gas B composed of 200 ppm of nitrogen monoxide (NO), 2000 ppm (conversion to carbon) of normal hexadecane ($nC_{16}H_{34}$), 1100 ppm of carbon monoxide (CO), four volume percent of carbon dioxide ($CO_2$), four volume percent of oxygen ($O_2$), 15 volume percent of water ($H_2O$), and balance of nitrogen ($N_2$) were used. Meanwhile, a concentration of each composition in the model gas B is a value at 25 degrees Celsius and 1013 hPa (one atmospheric pressure).

Figure 11:
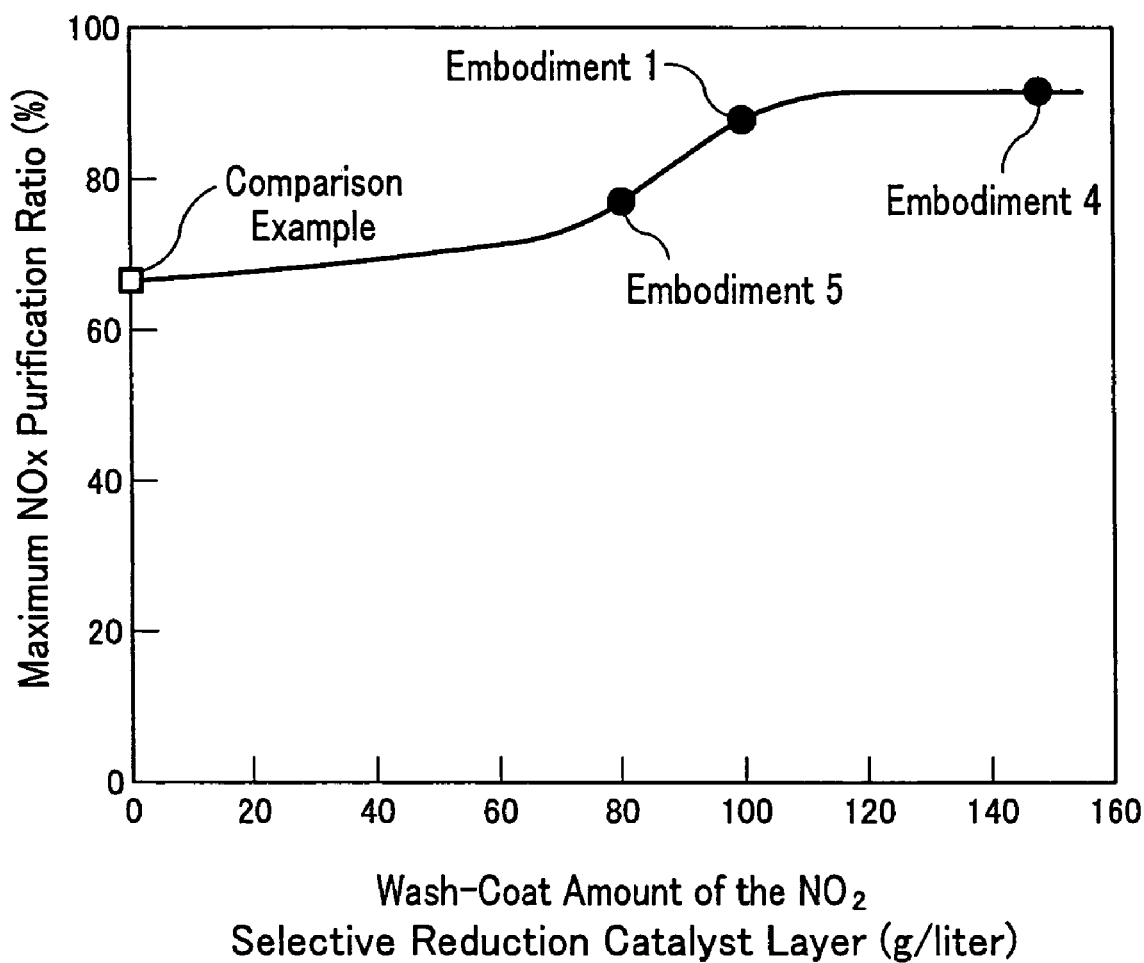
FIG. 11 is a graph showing a relationship between a maximum $NO_2$ adsorption ratio and a wash-coat amount of an $NO_2$ selective reduction catalyst layer in the exhaust gas purification systems of the embodiments 1, 4, and 5 and comparison example.

In the evaluation test, the model gas B maintained at 350 degrees Celsius was introduced into the exhaust gas purification system and a $NO_x$ amount of a gas discharged from the purification system was measured with an analyzer 90 (see FIG. 7A), thereby the $NO_x$ purification ratio of the purification system having been calculated. Meanwhile, the $NO_x$ purification ratio just after the start of the measurement was made a maximum $NO_x$ purification ratio. The result is shown in FIG. 11.

Equation 1:

$$\text{a } NO_x \text{ purification ratio (\%)} = ((\text{a } NO_x \text{ value in a model gas} - \text{a } NO_x \text{ value of an analyzer})/(\text{the } NO_x \text{ value in the model gas})) \times 100 \quad (1)$$

b. Embodiment 2

The exhaust gas purification system having been composed similarly to the embodiment 1 other than a wash-coat amount of the $NO_2$ adsorptive catalyst layer 17 having been changed from 150 g/liter to 100 g/liter, the measurement test of the $NO_2$ adsorption ratio was performed similarly to the embodiment 1. The result is shown in FIG. 9.

c. Embodiment 3

The exhaust gas purification system having been composed similarly to the embodiment 1 other than a wash-coat amount of the $NO_2$ adsorptive catalyst layer 17 having been changed from 150 g/liter to 20 g/liter, the measurement test of the $NO_2$ adsorption ratio was performed similarly to the embodiment 1. The result is shown in FIG. 9.

d. Embodiment 4

The exhaust gas purification system having been composed similarly to the embodiment 1 other than a wash-coat amount of the $NO_2$ selective reduction catalyst layer 18 having been changed from 100 g/liter to 150 g/liter, the measurement test of the $NO_x$ purification ratio was performed similarly to the embodiment 1. The result is shown in FIG. 11.

e. Embodiment 5

The exhaust gas purification system having been similarly to the embodiment 1 other than a wash-coat amount of the $NO_2$ selective reduction catalyst layer 18 having been changed from 100 g/liter to 80 g/liter, the measurement test of the $NO_x$ purification ratio was performed similarly to the embodiment 1. The result is shown in FIG. 11.

f. Comparison Example (1) Manufacture of Catalyst Component C of $NO_2$ Adsorptive Catalyst Unit Used Instead of $NO_2$ Adsorptive Reduction Catalyst Unit of Embodiment 1

Similarly to a forming process of the $NO_2$ adsorptive catalyst layer 17 of the embodiment 1, only the layer 17 with a wash-coat amount of 100 g/liter on an inner wall surface of the narrow porosities of the honeycomb support body similar to the embodiment 1 was formed, thereby a catalyst component C having been manufactured.

(2) Configuration of Exhaust Gas Purification System

Figure 7B:
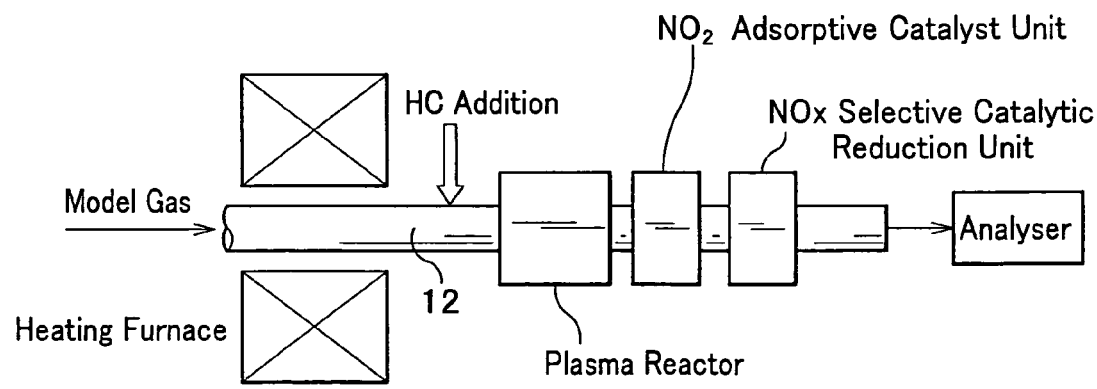

A system configuration of an exhaust gas purification system of a comparison example is shown in FIG. 7B. The exhaust gas purification system is, in the exhaust gas purification system of the embodiments 1 to 5, similarly composed other than using an $NO_2$ adsorptive catalyst unit, in which the catalyst component C is provided within a predetermined casing, instead of the $NO_2$ adsorptive reduction catalyst unit.

(3) Evaluation Test of Exhaust Gas Purification System

For the exhaust gas purification system, the measurement test of the cycle test and maximum $NO_x$ purification ratio was performed similarly to the embodiment 1. The results are shown in FIGS. 10 and 11, respectively.

The compositions and the like of the $NO_2$ adsorptive catalyst layer 17 and $NO_2$ selective reduction catalyst layer 18 related to the embodiments 1 to 5 and those of an $NO_2$ adsorptive catalyst layer related to the comparison example are shown in Table 1 as a summary.

TABLE 1

| | | Embodiment 1 | Embodiment 2 | Embodiment 3 | Embodiment 4 | Embodiment 5 | Comparison Example |
|---|---|---|---|---|---|---|---|
| $NO_2$ Adsorptive Catalyst layer | Na-USY type zeolite (g) | 100 | 100 | 100 | 100 | 100 | 100 |
| | Kalium nitrate (g) | 133 | 133 | 133 | 133 | 133 | 0 |
| | Alumina binder (g) | 50 | 50 | 50 | 50 | 50 | 50 |
| | Conversion thickness of the $NO_2$ adsorptive catalyst layer (wash-coat amount) (g/liter) | 50 | 100 | 20 | 50 | 50 | 100 |
| | Ag (silver) contained amount (mass percent) | 0 | 0 | 0 | 0 | 0 | 2.7 |
| $NO_2$ Selective Reduction Catalyst layer | Bemite (g) | 130 | 130 | 130 | 130 | 130 | — |
| | Kalium nitrate (g) | 4.72 | 4.72 | 4.72 | 4.72 | 4.72 | — |
| | Alumina binder (g) | 50 | 50 | 50 | 50 | 50 | — |
| | Conversion thickness of the $NO_2$ selective reduction catalyst | 100 | 100 | 100 | 150 | 80 | — |

TABLE 1-continued

|  | Embodiment 1 | Embodiment 2 | Embodiment 3 | Embodiment 4 | Embodiment 5 | Comparison Example |
|---|---|---|---|---|---|---|
| layer (wash-coat amount) (g/liter) | | | | | | |
| Ag contained amount (mass percent) | 2.7 | 2.7 | 2.7 | 2.7 | 2.7 | — | g. Evaluation Result of Exhaust Gas Purification System Related to Embodiments 1 to 5

As shown in FIG. 9, an exhaust gas purification system equipped with the $NO_2$ adsorptive catalyst layer 17 of which wash-coat amount is not less than 50 g/liter is superior in the $NO_2$ adsorption ratio. Accordingly, the exhaust gas purification system enables a $NO_x$ discharge, for example, at the starting time of an engine when an exhaust gas temperature is lower than the purification temperature of the $NO_2$ selective reduction catalyst layer 18, to be efficiently prevented.

As shown in FIG. 10, even if the exhaust gas purification system (embodiment 1) having a catalyst component in which the $NO_2$ selective reduction catalyst layer 18 is stacked on the $NO_2$ adsorptive catalyst layer 17 is repeatedly used, the $NO_2$ adsorption ratio in the $NO_2$ adsorptive catalyst layer does not lower compared with the exhaust gas purification system (comparison example) having a catalyst component of only an $NO_2$ adsorptive catalyst layer. This is thought to be attributable to $NO_2$, which is not dissolved with the layer 17, not being accumulated because by the $NO_2$ adsorptive catalyst layer 17 contacting the $NO_2$ selective reduction catalyst layer 18, $NO_2$ adsorbed to the layer 17 moves to the layer 18 by a concentration slant for the layer 18 and is dissolved in the layer 18.

As shown in FIG. 11, an exhaust gas purification system equipped with the $NO_2$ selective catalytic layer 18 of which wash-coat amount is not less than 100 g/liter is superior in a maximum $NO_x$ purification ratio. Accordingly, the exhaust gas purification system can efficiently purify the $NO_x$.

Thus, although the embodiments of the present invention are concretely described, the invention is not at all limited to such the embodiments.

For example, although the exhaust gas purification system 11 forms the $NO_2$ adsorptive catalyst layer 17 so as to broaden along the inner wall surface of the narrow porosities 16a of the support body 16 and stacks the $NO_2$ selective catalytic layer 18 on the layer 17, the exhaust gas purification system of the invention is not limited to this, and it may form the layer 18 so as to broaden along the inner wall surface of the narrow porosities 16a of the support body 16 and stack the layer 17 on the layer 18.

In addition, although in the exhaust gas purification system related to the embodiments the reducing agent supply controlling device 9 is connected only with the reducing agent supplying means 10 and temperature sensor not shown in the drawing of the $NO_2$ adsorptive reduction catalyst unit 14 (see FIG. 1), the purification system of the invention is not limited to this; and in the purification system, a temperature sensor detecting temperature may be provided with the $NO_x$ selective reduction catalyst unit 15 and the reducing agent supply controlling device 9 may be electrically connected with the temperature sensor. The exhaust gas purification system may be composed so that the reducing agent supply controlling device 9 judges whether or not the $NO_x$ selective reduction catalyst layer 19 has reached a purification temperature and according to the judgment a reducing agent supply stopping command signal or reducing agent supplying command signal is output toward the reducing agent supplying means 10.

In addition, although the exhaust gas purification system related to the embodiments makes a catalyst component support silver used for the $NO_x$ selective reduction catalyst unit 15, the purification system of the invention is not limited to this, and platinum, palladium, iridium, and the like may be supported in the catalyst component instead of silver.

What is claimed is:

1. An exhaust gas purification system equipped, from an upstream side toward downstream side through which an exhaust gas flows, with a plasma reactor and a catalyst unit charged with a catalyst acting on $NO_x$ in said exhaust gas in this order, and equipped with a reducing agent supplying device to supply a reducing agent at an upstream side of said plasma reactor,
    wherein said catalyst has an $NO_2$ adsorptive catalyst layer and an adjacent $NO_2$ selective reduction catalyst layer contacting the $NO_2$ adsorptive catalyst layer.

2. An exhaust gas purification system according to claim 1, wherein said $NO_2$ selective reduction catalyst layer is disposed on a surface of said catalyst, and said $NO_2$ adsorptive catalyst layer is disposed inside said $NO_2$ selective reduction catalyst layer.

3. An exhaust gas purification system according to claim 1, wherein said $NO_2$ adsorptive catalyst layer is a porous support to be made to support at least one kind of alkali metal, alkali earth metal, and rare earth metal; and said $NO_2$ selective reduction catalyst layer is a porous support to be made to support silver.

4. An exhaust gas purification system according to claim 2, wherein said $NO_2$ adsorptive catalyst layer is a porous support to be made to support at least one kind of alkali metal, alkali earth metal, and rare earth metal; and said $NO_2$ selective reduction catalyst layer is a porous support to be made to support silver.

5. An exhaust gas purification system according to claim 2, wherein said $NO_2$ adsorptive catalyst layer is stacked on an inner wall surface of narrow porosities of a support body with a plurality of the narrow porosities, and mass of said $NO_2$ adsorptive catalyst layer per unit volume of said narrow porosities is not less than 50 g/liter and not more than 100 g/liter; and wherein said $NO_2$ selective reduction catalyst layer is stacked on said $NO_2$ adsorptive catalyst layer, and mass of said $NO_2$ selective reduction catalyst layer per unit volume of said narrow porosities is not less than 100 g/liter and not more than 250 g/liter.

6. An exhaust gas purification system according to claim 3, wherein said $NO_2$ adsorptive catalyst layer is stacked on an inner wall surface of narrow porosities of a support body with a plurality of the narrow porosities, and mass of said $NO_2$ adsorptive catalyst layer per unit volume of said narrow porosities is not less than 50 g/liter and not more than 100 g/liter; and wherein said $NO_2$ selective reduction catalyst layer is stacked on said $NO_2$ adsorptive catalyst layer, and mass of said $NO_2$ selective reduction catalyst layer per unit volume of said narrow porosities is not less than 100 g/liter and not more than 250 g/liter.

7. An exhaust gas purification system according to claim 3, wherein a silver support amount of said $NO_2$ selective reduction catalyst layer is not less than 1.5 mass percent and not more than 5 mass percent for the mass of the $NO_2$ selective reduction catalyst layer.

8. An exhaust gas purification system according to claim 4, wherein a silver support amount of said $NO_2$ selective reduction catalyst layer is not less than 1.5 mass percent and not more than 5 mass percent for the mass of the $NO_2$ selective reduction catalyst layer.

9. An exhaust gas purification system according to claim 5, wherein a silver support amount of said $NO_2$ selective reduction catalyst layer is not less than 1.5 mass percent and not more than 5 mass percent for the mass of the $NO_2$ selective reduction catalyst layer.

10. An exhaust gas purification system according to claim 6, wherein a silver support amount of said $NO_2$ selective reduction catalyst layer is not less than 1.5 mass percent and not more than 5 mass percent for the mass of the $NO_2$ selective reduction catalyst layer.

11. An exhaust gas purification system according to any one of claims 1 to 10, wherein a $NO_x$ selective reduction catalyst unit charged with a $NO_x$ selective reduction catalyst is disposed at a downstream side of said catalyst unit.

12. An exhaust gas purification system according to claim 11, wherein said $NO_x$ selective reduction catalyst is a porous support to be made to support silver and a silver support amount of said $NO_x$ selective reduction catalyst is not less than 1.5 mass percent and not more than 5 mass percent.

* * * * *